July 30, 1935.  H. E. KEYES  2,009,667
PERCOLATION LEACHING METHOD
Filed June 21, 1930
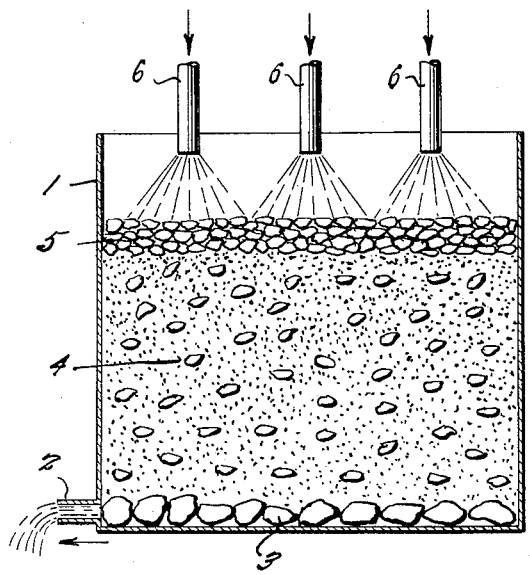
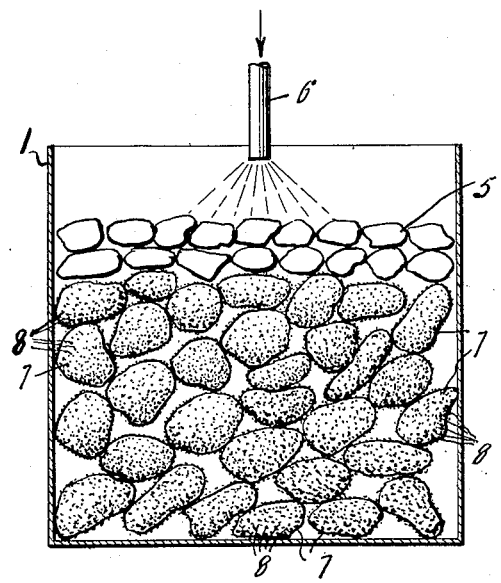
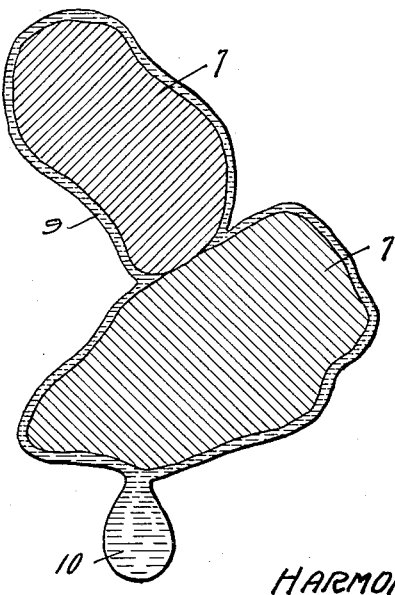
Inventor
HARMON E. KEYES
By Semmes & Semmes
Attorneys Patented July 30, 1935

2,009,667

UNITED STATES PATENT OFFICE 2,009,667

PERCOLATION LEACHING METHOD

Harmon E. Keyes, Miami, Ariz.

Application June 21, 1930, Serial No. 462,936

6 Claims. (Cl. 23—268)

This invention has to do with the extraction of substances by leaching methods and is applicable to various branches of the mineral and chemical industries where leaching of finely divided substances is practiced. My invention will be more clearly illustrated by referring first to standard leaching practice. This is of two types—agitation and percolation, the former dealing with fine and the latter with coarse material. In either case the solid particles to be leached are completely surrounded by the solution which exists as a continuous phase. In my method, however, free and open drainage is provided the charge and the solution covering the individual particles is in the form of thin individual films, or, so to speak, a discontinuous liquid phase, these films being surrounded by air spaces or voids between the particles, as distinguished from the prior art processes, in which a body or mass (rather than a film) of liquid was employed. By my method these voids or air spaces are caused to persist during the leaching operation so that the mass is kept open and porous, thereby permitting ready downward percolation of the leaching solution. This method has a distinct advantage in processes in which contact with air is desirable during the leaching operation, such as in cyaniding gold or silver ores and in leaching copper sulphides.

In order to more clearly explain the invention there is shown in the accompanying drawing in diagrammatic form the conditions obtaining during the process.

In the drawing:

Fig. 1 represents, diagrammatically, the character conditions of the leaching column of the improved invention.

Fig. 2 is a view similar to Fig. 1 in an enlarged or exaggerated form.

Fig. 3 is an exaggerated view of the agglomerated particles utilized in the present invention.

It is generally known in metallurgical leaching practice that there is a minimum degree of fineness to which ore particles may be crushed for subsequent percolation leaching. The reason for this is because the leaching column becomes clogged by the fine material, thus preventing the desired rate of solution percolation. If the fine material in the charge is evenly distributed it tends to fill the void spaces between the coarse particles, which clogs the mass, the extent being a function of the quantity of slimes and degree of fineness. Attempting to force the solutions downward by pressure makes this mass more compact, and if upward percolation is used the solution may be readily forced through, but in doing so local channels are produced which render the leaching ineffective in other parts of the mass. This effect is partly overcome in certain metallurgical plants by charging the material in such a manner that the coarse particles roll down the sloping side of the charge to the bottom, thus keeping the fines segregated at the top so that the leaching solution comes into fairly good contact with the material by using upward percolation. However, if the substance is quite finely crushed, say to minus ¼-inch or finer, it is less likely to produce this desired segregation of coarse and fine material and the fine material suspended in the charge tends to fill the void spaces between the larger particles. By my method this rate of percolation may be increased to many times above its value by ordinary percolation methods when used on the same class of material. This makes possible a higher extraction of values in a given time. Furthermore, well-known effects of clogging and channeling are largely minimized by my method. Among the various classes of mineral substances to which this method may be applicable are: Copper oxide and sulphide ores; copper concentrate; smelter flue dusts; gold or silver ores; and mill tailing. By this method it may be possible to eliminate classification and separate slime treatment in the cyanidation of gold and silver ores. It has a distinct advantage over agitation methods due to its simplicity and cheapness of equipment and operating costs.

Recognition is made of standard practice in the heap leaching of copper ores and the leaching of broken ore underground, but such leaching is fundamentally different from this invention in that my method uses fine material, produces porosity in the charge, and makes use of extenuated or thin surface films of solution surrounding the individual particles as the solution travels down; while in the aforementioned practice coarse material is generally used and the top of the mass is periodically flooded with solution, which in its downward passage is not necessarily divided up into such thin films. Furthermore, the ore is not previously prepared for leaching as in my method.

The general procedure is as follows: The ore or substance to be leached is crushed or ground to the required fineness in the ordinary way, or if it consists entirely of slimes is mixed with the required amount of coarse material. A small portion of the coarse material representing about 1 to 2 per cent of the total, which may be about ¼-inch in size, may be screened out or secured from another source to be later laid on top of the charge. The main portion is treated in such a manner as to cause any slime particles which it may contain to cohere together or to adhere to the coarser particles, and is mixed together and if necessary screened so that the maximum size of the lumps is of suitable size which may equal approximately the diameter of the original coarser particles. It has been found that ordinary water or the leaching solution to be used may be employed to cause this agglomeration of particles, or that material existing as a sludge may be partially dried. However, my invention deals with the treatment of agglomerated particles, and it is not my intention to limit its scope to the use of any specific liquid or other substance for this purpose. In ordinary ores about 7 per cent of moisture has been found to produce the proper consistency; however, this may vary between wide limits, depending upon the relative percentage of coarse or fine material.

When the material has been properly screened and mixed it consists of small spheres or globules held together by the agglomerating substance and by the surface forces acting. It is not necessary that a strong binder be used as these globules are retained in their general shape during the leaching operation by certain forces, which will be hereafter referred to as internal forces, acting within the mass. The following are the forces which appear to be operative in this case: Cohesion; adhesion; capillarity; surface tension; affinity; and gravitation. However, this invention pertains to the production of a specific result regardless of the various causes which future research may prove to exist.

To a certain extent segregation of fines may be prevented and my method of agglomerating may be crudely accomplished by merely moistening the material after crushing, but this is not nearly as effective as the procedure outlined. The ore or material is now charged into a suitable leaching apparatus, such as a bin, vat, or tank. In contradistinction to standard leaching practice it is not required that this container be so constructed as to withstand a hydrostatic head of several feet of solution. Because of the open drain it is only necessary that a water-tight bottom be provided, covered by a suitable substance which will allow the solutions to drain off, such as crushed rock or a filter bottom, and the sides of the apparatus simply serve to hold the ore or material in place mechanically. The depth of the charge will depend on local conditions. Due to the more uniform nature of the material than is found in former practice it is not necessary to adopt the usual precautions which are taken to control segregation of coarse and fine particles. After the charge has been placed it is leveled off, and over the surface is spread a layer which may be a few inches deep of the sized coarse material which has been previously referred to. If desired any suitable porous substance may be substituted.

The leaching solution is now applied by any convenient method such as spraying, trickling, absorption, etc. Launders or any other distributing devices may be used as desired. The main essential is that the solution be applied gently without appreciable impact and at a rate of transfer or passage from the porous layer to the top of the charge not exceeding the percolation rate of the leaching column. Thus it is seen that this method is distinctly different from practice of leaching heaps and broken areas underground, above referred to. It has been observed that by my method the solution is evenly and gradually distributed to the top of the ore column through the medium of the layer of coarse material or other substance, and is gradually absorbed into the ore charge. Additions of solution may be made either intermittently or continuously, as desired, it being my purpose not to limit my invention to any procedure concerning the manner of adding solutions excepting as above stated, that the rate of addition at any time should not exceed the rate of percolation. Under the conditions as stated the solution now is quickly transferred into all parts of the charge even though it has been added at points relatively far apart and not applied uniformly over the top. This is due to the physical nature of the ore charge which has been prepared according to my invention. Thus clogging and channeling in local areas are largely minimized by this method. I have further discovered that under these conditions the agglomerated spheres retain their general shape and form whereby the void spaces continue to exist between the particles, thus causing the solution as it percolates through the mass to be subdivided as thin films. The above-mentioned internal forces serve to force the solution into all parts of the mass, to cause the agglomerated particles to retain their general shape and form and to bring the solution into intimate contact with all of the ore particles. Thus it is seen that by my method percolation leaching of slimes is accomplished. One of the factors that aids the rate of percolation is probably the cohesive property of water which keeps the minute streamlets of water continuous. This appears to be the converse of the same principle which causes sap to run up the trunk of a tree. The net effect is to permit a surprisingly large rate of percolation.

The conditions of the operation will be more fully appreciated from an inspection of the accompanying drawing. In Fig. 1 a leaching element or column 1 is employed. This is provided with an outlet 2 adjacent the bottom. On the bottom of the vat is placed a layer of permeable material 3 which serves to retain the mass to be leached in position in the column but allows free drainage of the leaching solution. These may be coarse aggregates or a screen. The improved charge is indicated generally at 4. This charge, as pointed out, consists of agglomerates made up by utilizing the finer particles and the coarser particles in the charge, achieved by wetting the surfaces with a predetermined amount of solution so as to cause adsorption. Depending upon the type of ore used, the water employed may vary between 4 and 15%.

As noted a top coarse porous layer 5 is provided for the purpose of distributing or distending the solution or charge and preventing strong impact of the solution upon the agglomerated material. This layer serves to break the impact of the descending solution and to distend or divide it into separate and distinctly individual films. It will be noted that the present leaching column is always open and hence submergence or flooding of the leaching solution is prevented. The solution may be applied through a plurality of pipes 6 or by any other method which would insure a relatively wide distribution of the leaching solution over the upper surface. The surface films instituted by the layer 5 pass separately over the individually agglomerated particles and by reason of the surface forces acting these films retain their form, thus coming into intimate contact with the agglomerated units and maintaining the slimes adhered to the larger particles. As pointed out hereinbefore, the solution from the pipes 6 is applied gently and without appreciable impact and at a rate of transfer from the porous layer 5 to the top of the agglomerated charge not exceeding the percolation rate of the leaching column. In other words the rate of flow of the solution through the pipe 6 and withdrawal from the pipe 2 are so correlated as to positively prohibit flooding of the mass.

The physical condition of the material in the leaching column is disclosed more in detail in Fig. 4. As shown therein the leaching column is made up of a mass of agglomerates which are constituted, so to speak, by coarse or larger particles 7 on which are adhered the fines or slimes 8. The top layer 5 is constituted of relatively large and hard aggregates and is of sufficient depth to subserve the function noted, namely to break the force of impact of the solution and sufficiently coarse to distribute such solution in the form of thin films to the subjacent agglomerated mass.

In Fig. 3 is indicated diagrammatically the agglomerated condition. This figure discloses in exaggerated scale two agglomerates which consist of larger particles 7, on which are adhered the slimes or fines. These fines cling to the surface of the larger particles due to the action of the thin solution film 9. The film not only envelopes the agglomerated particles, but due to gravity the solution travels downwardly, in the form of continuous individual thin films and drops from the particles, as shown at 10.

Examples

*No. 1.*—A typical chalcocite ore containing approximately 2 per cent copper was crushed to pass a 10-mesh screen. 1700 grams were placed in a glass tube 5 feet high by 1½ inches in diameter. The ore was charged in dry but it was impossible to prevent segregation of coarse and fine material. A ferric sulphate—sulphuric acid leaching solution containing approximately 1 per cent acid and 1 per cent iron was slowly dripped onto the top, open drainage being provided at the bottom. In a short time the column plugged, due to the layers of slimes which had segregated. The sample was then emptied out, mixed thoroughly and replaced. This prevented segregation of layers of slime, but it was found that the slimes now filled the interstices between the coarse particles, and the column again plugged. The sample was emptied out again and dried to about 7 per cent moisture, mixed thoroughly and replaced in the tube. It was now found that the slime particles coated the coarse particles in such a manner that the entire mass consisted of nearly uniform globules having a solid kernel and a coating of slime. Under these conditions the solution not only percolated through the mass but permeated into all portions of it very readily until, after several days, it was noted that the impact of the dripping solution at the top had disintegrated the globules at this point, thus allowing the fines to fill the interstices and cause plugging again. The sample was allowed to drain and about an inch of material at the top carefully removed. This was replaced by sized ¼-inch silica, which absorbed the impact of the dripping solution and allowed even and uniform diffusion of the solution into the mass of ore. This was the end of further trouble, and the solution readily percolated through the ore at any reasonable rate desired. Observation through the glass wall showed that the agglomerated particles retained their shape clear to the bottom of the tube. There was absolutely no tendency for them to disintegrate even after a week's steady percolation.

*No. 2.*—2500 grams of copper concentrator tailing from one of the large plants in the southwest were taken, having the following screen analysis:

| Size Mesh | Per cent |
|---|---|
| +10 | .08 |
| −10+20 | 13.45 |
| −20+35 | 26.28 |
| −35+100 | 27.00 |
| −100+200 | 16.91 |
| −200 | 16.28 |
| | 100.00 |

*Assay head sample*

| Total copper | Acid-soluble copper | Sulphide copper |
|---|---|---|
| 0.73% | 0.50% | 0.23% |

The following conditions were employed:
Ordinary glass percolators 12 inches high by 6½ inches diameter at the top were used, having plugs of cotton at the bottom.

A. The ore was charged in dry.
B. The ore was pulped with water to make a sludge before charging.
C. 10.8 per cent water was added, the sample thoroughly mixed, screened through a 10-mesh sieve to reduce the lumps, and mixed thoroughly to agglomerate the particles before charging. A layer 1 inch deep of ¼-inch crushed silica was placed over the top. This procedure is an example of my method.

A solution containing about 1 per cent sulphuric acid and no iron was allowed to drip onto each of the three samples, A and B being given the maximum solution that would percolate through, while C was given only sufficient solution to extract the copper in about 40 hours' time. The results are given in terms of per cent extraction of the different samples over a similar period of time and a comparison of the different maximum possible percolation rates.

*Comparison of extractions*

| Sample | Hours | Per cent extraction oxide copper | Per cent extraction sulphide copper |
|---|---|---|---|
| A | 40½ | 27.5 | Nil |
| B | 45½ | 1.3 | Nil |
| C | 40½ | 99+ | 23.6 |

*Comparison of maximum percolation rates*

| Sample | c. c. | Hours | c. c.'s per hour | Relative speed of percolation "C" over "A" and "B" |
|---|---|---|---|---|
| A | 347 | 24 | 14.5 | 40.0 |
| B | 27 | 24 | 1.1 | 527. |
| C | 290 | ½ | 580. | |

I claim:
1. A method of leaching substances comprising finely dividing the substance, drying the sub- stance to a predetermined moisture content sufficient to effect agglomeration of the smaller particles on larger particles when intermixed thoroughly mixing the mass of smaller and larger particles so as to adhere the smaller particles to the larger particles to form individual agglomerates placing the mixture of agglomerates in a leaching vessel, depositing a layer of large particles of relatively hard material thereon, and discharging the leaching solution gently and without appreciable impact onto the layer of relatively hard particles so that the leaching solution will percolate through the charge without flooding and consequent disintegration of the agglomerated particles.

2. In a method of leaching an ore charge containing finely divided material, the steps of agglomerating the finely divided material with larger particles of the charge, creating and preserving dispersed separate surface films of solution within the agglomerated ore charge during leaching, and thus bringing the leaching solution into intimate contact with the mass.

3. A method of leaching comprising the step of agglomerating finely divided mineral or other particles with larger particles by agitating the finely divided material and larger particles with a predetermined quantity of liquid, next leaching the agglomerated particles by applying a leaching solution thereto, and controlling the rate of application of the solution so that a continuous leaching film is provided in the mass and flooding is avoided.

4. A method of leaching ores comprising grinding the material, regulating the water content thereof so as to permit agglomeration of the smaller particles on the larger particles, agitating the mass so as to adhere the smaller particles to larger units to form individual agglomerates, then depositing on the charge of agglomerated material a layer of hard material of a size larger than the agglomerated particles, and discharging the leaching solution onto said layer of hard material at such a rate as to distribute the leaching solution into the mixture in the form of separate distinct films and thus to prevent flooding of the mass and disintegration of the agglomerated aggregates.

5. A method of leaching comprising the step of agglomerating finely divided material or other particles with larger particles by agitating the finely divided and suitably moistened material with the larger particles, then sizing the agglomerated particles, next leaching the sized agglomerated particles by applying a leaching solution thereto, and controlling the rate of application and withdrawal of the solution so that a continuous leaching film is provided in the mass and flooding is avoided.

6. A method of leaching ores comprising finely dividing the material, agglomerating the fines with the larger particles thereof, placing the mixture of agglomerates in a leaching vessel, depositing a layer of large particles of relatively hard material thereon, and gently discharging the leaching solution onto the layer of relatively hard particles at such a rate that a continuous leaching film is provided in the mass and flooding is avoided.

HARMON E. KEYES.

Patent No. 2,009,667 Granted July 30, 1935
HARMON E. KEYES

The above entitled patent was extended October 2, 1951, under the provisions of the Act of June 30, 1950, for 6 years and 83 days from the expiration of the original term thereof.

*Commissioner of Patents.*